Aug. 8, 1933.   L. HENDERSON   1,921,357
CONNECTION WITH CONTINUOUS ROLLING MACHINES AND THE LIKE
Filed Nov. 18, 1931   2 Sheets-Sheet 1
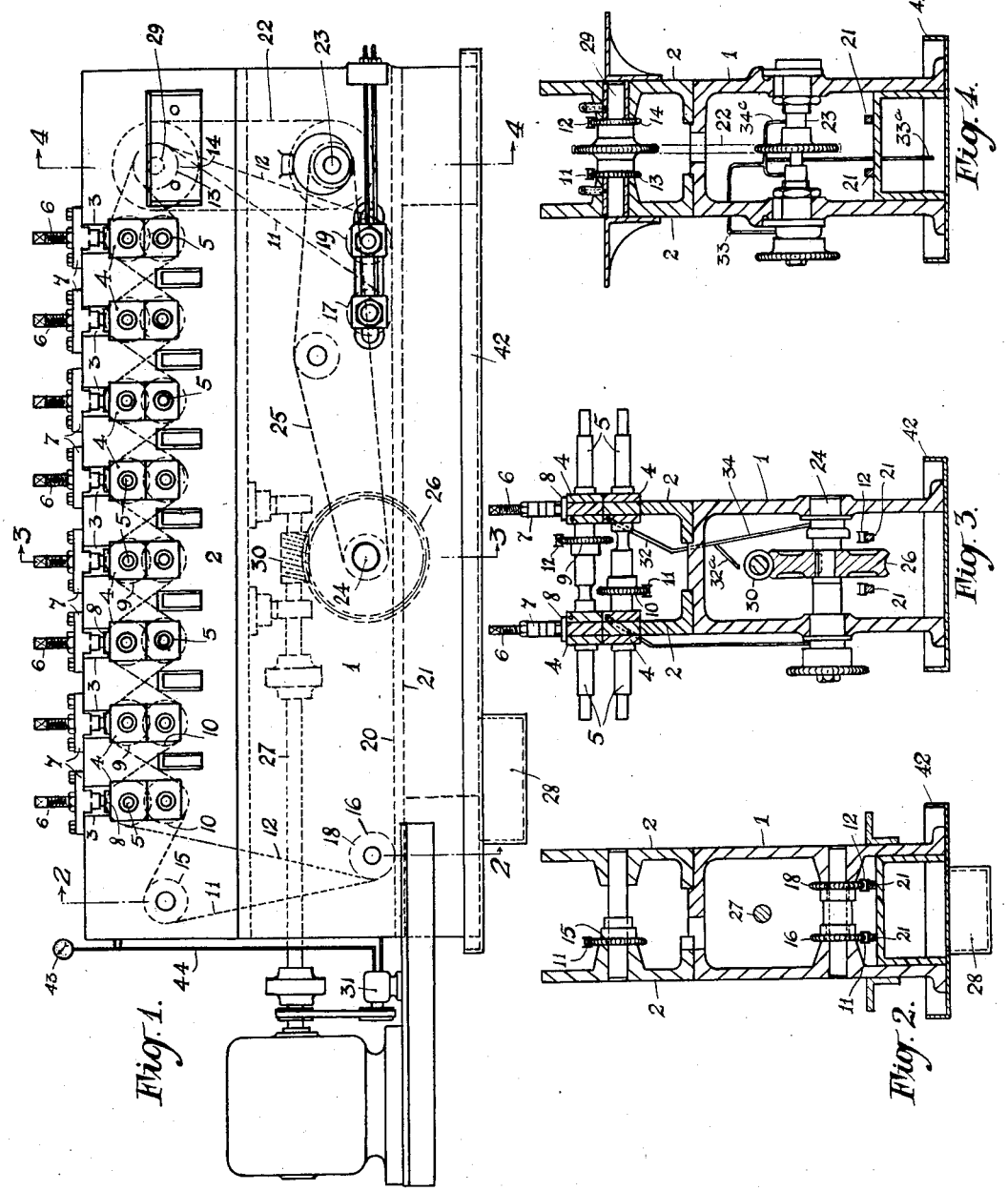

Aug. 8, 1933.  L. HENDERSON  1,921,357
CONNECTION WITH CONTINUOUS ROLLING MACHINES AND THE LIKE
Filed Nov. 18, 1931    2 Sheets-Sheet 2

Patented Aug. 8, 1933

1,921,357

UNITED STATES PATENT OFFICE 1,921,357

CONNECTION WITH CONTINUOUS ROLLING MACHINES AND THE LIKE

Leonard Henderson, Olton, England, assignor to Metal Sections Limited, Birmingham, England, a Company of Great Britain Application November 18, 1931, Serial No. 575,914, and in Great Britain April 13, 1931

3 Claims. (Cl. 153—54)

This invention relates to rolling machines or mills, particularly of the type having a series of pairs of rolls for bending strips of metal to a particular shape in cross section. Heretofore the rolling shafts have been driven by intermeshing spur gearing which restricts the smallness of the rolls and is not readily adaptable for changing over to deal with work requiring a different diameter of rolls; and this invention has for its object to obviate these defects and also to provide a machine which is efficient in action and which will expedite the rate of production.

According to the present improvements, the roll spindles are driven by sprocket and chain drive which is preferably so arranged that the pull of the chain drive exerts a pressure forcing the rolls of a pair together, and consequently counteracting the pressure forcing the rolls apart when the "work" is passing between the rolls. A series of pairs of rolls are driven by two chains so arranged that each roll of a pair is driven by a separate chain and so that each chain gears successively with chain sprockets on lower and upper roll shafts of adjacent pairs of rolls. The chain sprockets may be mounted on the roll spindles intermediate their ends, and rolls may be mounted on each end of the spindle. The driving chains may pass over guide pulleys on the underside of the shafts and the run of the chain between these guide pulleys is supported on a guide bar. One of these guide pulleys for each chain is adjustable so that the tension of the chain may be adjusted. The machine is driven by motor or other power driven shaft which passes longitudinally in the interior of the machine frame. Transmission mechanism driving the roll sprocket chains is also located in the interior of the machine. The roll spindle and other bearings are lubricated by gravity feed in a continuous system of oil circulation.

Referring to the drawings:—

Figure 1 is a side elevation of a machine constructed according to this invention.

Figure 2 is a section on the line 2—2 of Figure 1.

Figure 3 is a section on the line 3—3 of Figure 1.

Figure 4 is a section on the line 4—4 of Figure 1.

Figure 6:
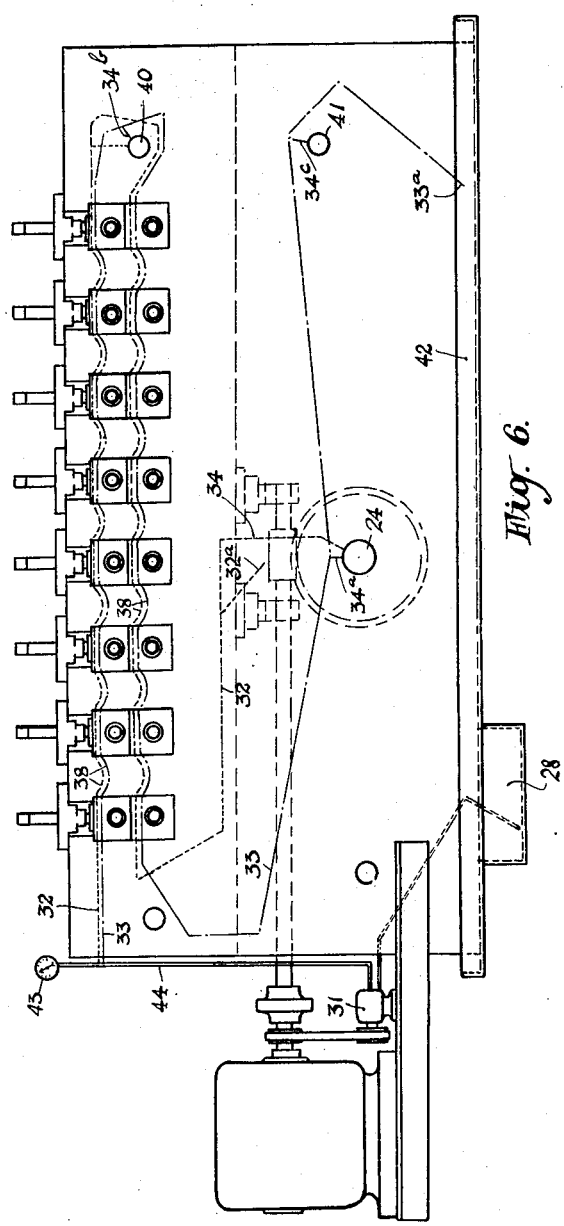
Figure 6 is a side elevation showing diagrammatically the oil circulating system.
Figure 5:
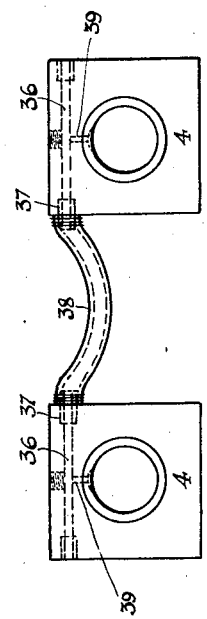
Figure 5 is a side elevation of two bearing blocks showing the oil feed.

The machine frame comprises a hollow frame member 1 which is superimposed by the side frame members 2. The frame members 2 are provided with slots 3 in which the bearing boxes 4 for the roll spindles 5 are slidably mounted. These bearing boxes are pressed together in the usual manner by the screwed spindles 6 which engage the blocks 7 fixed to the frame member 2. The end of each spindle 6 may have a head thereon which engages a recess in the cap 8 fixed to the upper bearing box 4. Not only therefore will the bearing boxes be pressed together by turning the spindles 6 but when the spindles are turned in the reverse direction the bearing boxes are separated for convenience in changing the rolls. The roll spindles 5 project on each side of the frame members 2 so that the rolls may be mounted on each end of the spindles and consequently two sets of rolls may be simultaneously in action. The upper roll spindle of each pair is fitted with a chain sprocket 9 whilst the lower roll spindle is fitted with a chain sprocket 10. These sets of chain sprockets are arranged out of alignment to receive separate driving chains, and the chain sprockets on the upper roll spindles are alternately arranged to gear with two chains, whilst the chain sprockets on the lower roll spindles are similarly arranged. Each chain therefore passes in a zig-zag manner to alternately drive, for instance, the lower roll spindle of one pair and the upper roll spindle of the next adjacent pair of rolls. The two continuous chains 11 and 12 pass over respectively the chain sprockets 13 and 14 on the driven spindle 29, and after passing over the roll spindle chain sprockets, the chain 11 passes over the guide chain sprockets 15, 16 and 17, and the chain 12 passes over the guide chain sprockets 18 and 19. The lower runs 20 of the chains are supported on guide bars 21 to prevent sag and therefore to enable the chains to be accurately tensioned. The shaft 29 carrying the chain sprockets 13 and 14 is driven by the chain sprocket drive 22 from an intermediate spindle 23. This spindle 23 is driven from a spindle 24 by means of the chain and sprocket drive 25, and the spindle 24 carries a worm wheel 26 which gears with the worm 30 on the motor driven shaft 27. This motor driven shaft passes longitudinally down the interior of the machine, and the reduction and power transmission gearing is also located in the interior of the machine. The roll spindle driving chains are also located in the interior of the machine. By so designing the construction of the machine, both sides of the machine can be effectively utilized whilst moreover there are no inconvenient projecting members which detract from the free movement and transport of the "work". An oil tray 28 is provided in the interior of the machine and the chains and the worm wheel 30 are automatically lubricated. All the bearings are also lubricated by means of a continuous circulating system for which purpose a pump 31 draws the oil from the tank 28 and forces the same through conduits leading to the bearings. The oil is forced up the pipe 44 from which it passes to the two ducts 32 and 33. The duct 32 passes through the upper bearing blocks 4 and back through the lower bearing blocks on one side of the machine and then flows out on the worm 30. The branch pipe 34 leads the oil to one bearing for the shaft 24 carrying the worm wheel 26. Holes or through ducts 36 are drilled in the bearing blocks 4 and union pipes 37 are screwed in such holes and connected by flexible pipes 38 to enable the blocks to be adjusted. Small feed holes 39 are drilled in the blocks to permit oil to flow to the bearing surface, but as the oil is free to flow straight through the duct 32, the feed to the bearing surfaces is substantially gravity feed. The duct 33 similarly passes through the bearing blocks 4 on the other side of the machine, branch pipes 34a, 34b and 34c feeding oil to the bearing of the shaft 24, and bearings such as 40 and 41 for shafts 29 and 23 respectively. Any other bearings may be similarly lubricated. The outlet ends 32a and 33a of the ducts 32 and 33 allow the oil to pass straight through into the tray 42. A gauge 43 is provided to indicate that the oiling system is correctly functioning. The oil is forced straight through the ducts 32 and 33 and out through the free end into the tray, and consequently the oil merely gravitates through the branch ducts feeding the bearings. Should the bearings become loose therefore oil will not be squirted therefrom. The oil delivered on the worm 26 is splashed about sufficient to lubricate the chains, but branch ducts may be provided to deliver oil directly on the chains if necessary.

I claim:

1. A rolling mill comprising a plurality of pairs of roll spindles for receiving the material to be rolled between the rolls on each pair of spindles, bearing blocks in which the roll spindles are mounted, a slotted frame carrying the bearing blocks, a set of chain sprocket wheels mounted in alignment alternately on the upper and lower roll spindles of each pair, a driving chain arranged in a zig-zag manner over these chain sprockets so that the lower roll spindle of one pair is driven in the reverse direction to the upper roll spindle of the adjacent pair and with the driving tension on the chain applying an upward force to the lower roll spindle and a downward force to the upper roll spindle, a second set of chain sprockets mounted in alignment on the other spindles of each pair and a second chain mounted in a zig-zag manner thereon in a similar manner to the first mentioned chain, whereby both the upper and lower roll spindle of each pair are chain driven.

2. A rolling mill comprising a plurality of pairs of roll spindles for receiving the material to be rolled between the rolls on each pair of spindles, bearing blocks in which the roll spindles are mounted, a slotted frame carrying the bearing blocks, a set of chain sprocket wheels mounted in alignment alternately on the upper and lower roll spindles of each pair, a driving chain arranged in a zig-zag manner over these chain sprockets so that the lower roll spindle of one pair is driven in reverse direction to the upper roll spindle of the adjacent pair and with the driving tension on the chain applying an upward force to the lower roll spindle and a downward force to the upper roll spindle, a second set of chain sprockets mounted in alignment on the other spindles of each pair, a second chain mounted in a zig-zag manner thereon in a similar manner to the first mentioned chain, whereby both the upper and lower roll spindles of each pair are chain driven, guide pulleys on the underside of the roll spindles over which the chains pass, bars on which the runs of the chains between the guide pulleys are supported, and means for adjusting the tension of the chains.

3. A rolling mill comprising a frame having two side members a plurality of pair of roll spindles, bearing blocks fitted in each side frame for carrying the spindles so that each end of the spindles can receive a roll, a set of chain sprocket wheels mounted in alignment alternately on the upper and lower roll spindles of each pair, a driving chain arranged in a zig-zag manner over these chain sprockets so that the lower roll spindle of one pair is driven in the reverse direction to the upper roll spindle of the adjacent pair and with the driving tension on the chain applying an upward force to the lower roll spindle and a downward force to the upper roll spindle, a second set of chain sprockets mounted in alignment on the other spindles of each pair, a second chain mounted in a zig-zag manner thereon in a similar manner to the first mentioned chain, whereby both the upper and lower roll spindles of each pair are chain driven, a shaft, driving sprockets on said shaft over which the said two driving chains run, sprocket and chain gearing for driving said latter shaft between the two side members of the frame and means for oiling the chains located between the said side members.

LEONARD HENDERSON.